United States Patent

[11] 3,591,127

[72] Inventors Julian Luger
Torrance;
Stanley E. Summers, Woodland Hills, both of, Calif.
[21] Appl. No 763,546
[22] Filed Sept. 30, 1968
[45] Patented July 6, 1971
[73] Assignee Ametak, Inc.
New York, N.Y.

[54] BUTTERFLY VALVE STRUCTURE WITH COMBINED TRANSLATION AND ROTARY MOVEMENTS
9 Claims, 5 Drawing Figs.

[52] U.S. Cl. .................................................. 251/56, 251/161, 251/58, 251/73
[51] Int. Cl. ...................................................... F16k 1/22, F16k 1/24
[50] Field of Search ............................................ 251/161, 56, 160, 58, 73

[56] References Cited
UNITED STATES PATENTS

| 2,811,981 | 11/1957 | Harris | 251/161 X |
| 2,833,511 | 5/1958 | Fletcher | 251/160 X |
| 3,056,573 | 10/1962 | Matheson et al. | 251/58 X |
| 3,272,223 | 9/1966 | Sass | 251/161 X |
| 3,306,571 | 2/1967 | Bussi et al. | 251/160 X |
| 3,400,907 | 9/1968 | Horn et al. | 251/56 X |
| 3,452,961 | 7/1969 | Forsman | 251/58 X |

Primary Examiner—Arnold Rosenthal
Attorney—Robert E. Strauss

ABSTRACT: Valve structure with a combined poppet and butterfly action including a solid shaft connected to a sleeved valve closure. A web member is connected to opposed eccentric shaft bearings and disposed in an eccentric position to the shaft.

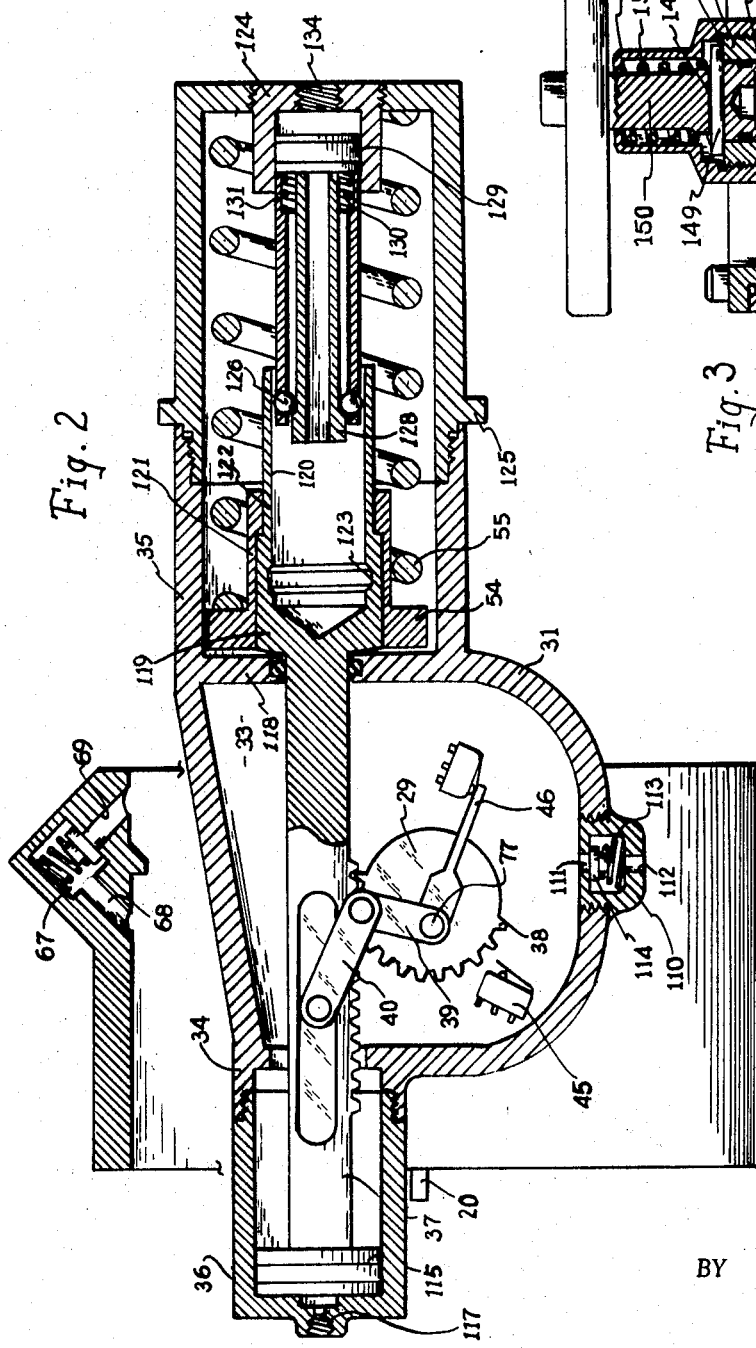

BUTTERFLY VALVE STRUCTURE WITH COMBINED TRANSLATION AND ROTARY MOVEMENTS

SUMMARY

A valve structure with a combined poppet and butterfly action is provided with trunnion-mounted bushings supporting an eccentrically positioned shaft on which the disc closure member is mounted. The sleeves are maintained in rotational alignment by an eccentric rib that extends through the valve housing in juxtaposition to the shaft. A hydraulic valve actuator is employed, preferably with a stationary piston and a moving cylinder, which has an integral rack that meshes with a sector gear on the shaft to rotate the assembly of bushings and disc closure member to the open position. The applied actuation force effects initial translation of the shaft in a poppet action through a link and crank connection from the rack to one of the trunnion-mounted bushings and to the other bushing through the eccentric rib. In this manner, a single side-mounted actuator can be used while still permitting use of roller- or sleeve-bearing support of the moving valve elements and thereby permitting use of the valve in high-pressure drop service.

DESCRIPTION OF THE INVENTION

This invention relates to valve structures which provide a compound action and in particular relates to a combined poppet-butterfly valve that is useful in high-pressure drop service and/or in cryogenic service.

Conventional butterfly valves employ a rotating disc-shaped valve closure member and have the advantage of a low-pressure drop in the open position where the disc presents a minimal obstruction to flow. These valves, however, have a fairly high maintenance requirement because of seal abrasion during use. The valves are also not suited for use in service experiencing wide temperature variations as the thermal distortion often exceeds the close tolerances to which these valves must be manufactured.

Valves exhibiting a combined poppet-butterfly action have been developed as a partial solution to the aforementioned difficulties of the purely butterfly valves. The task of imparting two successive movements to the valve closure member has often resulted in highly complex and unsatisfactory mechanisms. One attempted solution has been the use of two concentric shafts with an eccentric cam connection from the poppet action shaft to the valve closure member. Another construction uses trunnion-mounted bushings which support an eccentrically positioned shaft attached to the valve disc and uses synchronous motors to drive the bushings. Another approach has been to use a single actuator for the bushings but to rely on the eccentrically positioned disc to interlock the bushings.

All the preceding have some disadvantages. The cam connections provide only point bearings and cannot be used for transmitting sufficient force to overcome high-pressure drops in opening and closing of the valve. The use of synchronous motors is cumbersome and the use of the disc member to interlock the bushings results in stress on this member, preventing adequate seating in the closed position.

The disadvantages of the prior attempts to provide a poppet-butterfly valve are obviated by this invention which comprises a valve structure with trunnion-mounted bushing that support an eccentrically positioned shaft carrying the valve closure member with an eccentric rib or tie between the bushings and passing through the valve housing in juxtaposition to the shaft.

The bushings and closure member are mechanically linked as hereafter described in a manner that engages and disengages the valve member from its seat in a purely axial movement with rotation of the valve member delayed until the valve member is out of engagement with the seat. This action ensures maximum life of the seat and provides a valve with a tightly seating valve member.

The valve structure of this invention can also be provided with a hydraulic actuation wherein a reciprocating rack which drives a sector gear carried by the disc shaft has a link and crank connection to the bushing assembly with the link oriented so that the maximum force transmission occurs with the link at a minimum angle of inclination to the rack thereby providing that the maximum force transmission on the link occurs with a minimum component transverse to the rack and thus providing for minimum loading of the rack bearings. Valve-locking detents and position-registering switches can also be provided.

The invention will now be described with reference to the FIGURES, of which:

FIG. 2 is a cross-sectional view through the actuator;

FIGS. 3 and 4 are sectional views of alternative actuators; and

Figure 1:
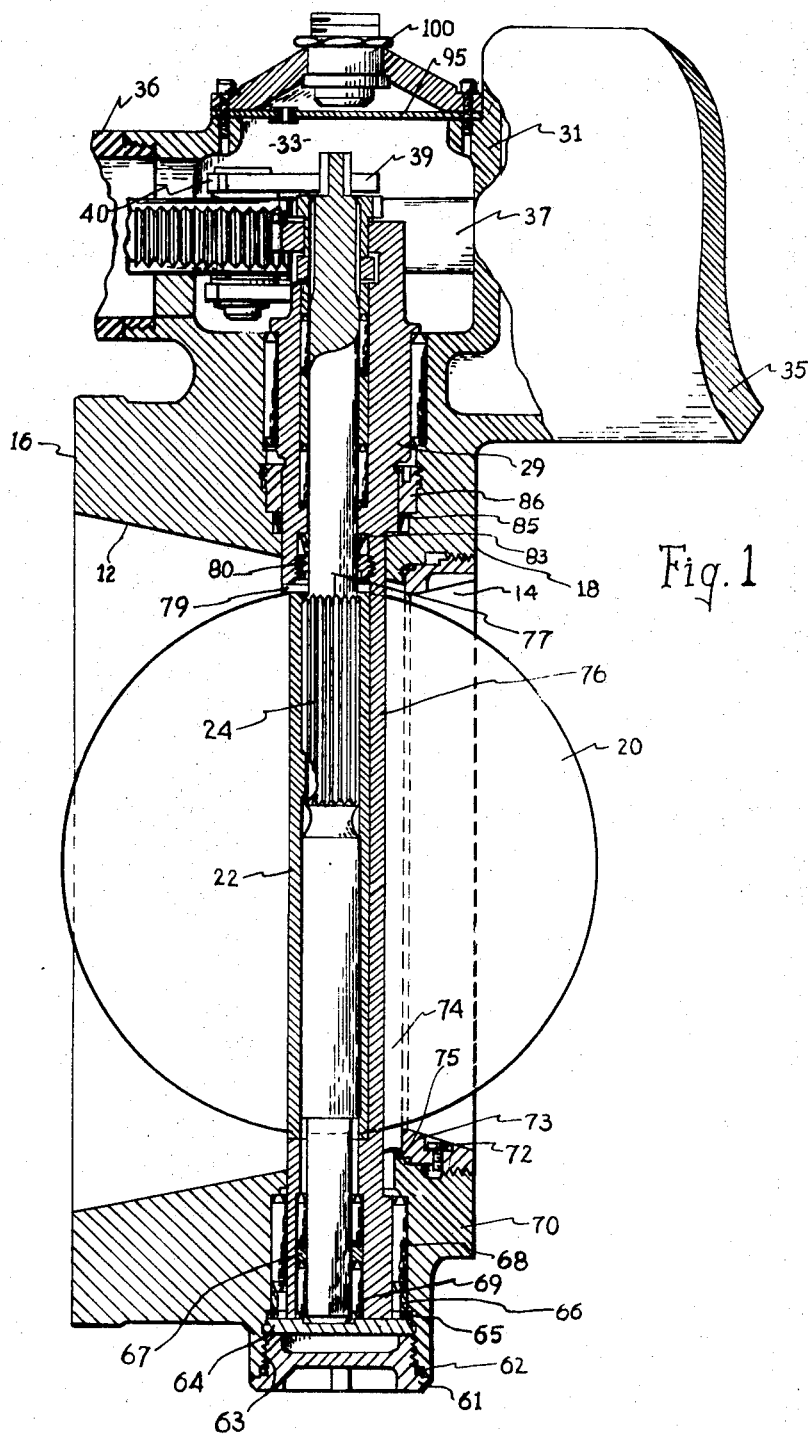
FIG. 1 is a cross-sectional view through the valve.

Referring now to FIG. 1, the valve is shown with a housing or body 10 having an upstream intake port 12 and a downstream exit port 14. The valve faces 16 and 18 are illustrated with conventional flanged fittings for attachment to fluid conduits, however, if desired other conventional means such as pipe threads can be provided.

Positioned within the housing is a closure member 20 which is shown in the open position. This member is disc shaped and has a centrally positioned sleeve 22 that surrounds shaft 77; preferably with positive interlocking means such as the splined interconnection shown at 24.

The valve closure member 20 illustrated as a typical butterfly disc, seats against seal ring 74 which is preferably formed of a resilient material with low cold flow tendency, e.g., Kel-F. The seal ring is secured about the periphery of exit 14 by retainer 73 which has a serration 25 that matches a groove in the face of the body 10. The closure member is provided with a peripheral bead 21 which improves the seating and sealing of the member against the seat 74. The retainer 73 is turned into threads tapped on the inside edge of bore 14 in housing 10 and screws 72 can be used to lock the retainer in position.

Shaft 77 is supported at opposite ends by suitable bearing supports such as sleeve or roller bearings, preferably needle bearings 69 that are carried by bores in bushings 29 and 30. Spacers such as 67 are provided to separate the bearings. The bushings are rotatably mounted in trunnions in the valve housing with needle bearings 68 or with sleeve bearings, if desired. The bushings 29 and 30 are mounted on a common centerline X—X' which is eccentric to the centerline of shaft 77. The lower trunnion has spacer 66 which supports bearings 68 and which rests on washer 65, retainer 64 and cap 61 which is turned into threads tapped in bore 63 in the trunnion. Seal 62, of conventional O-ring shape, is supported between cap 61 and body 10.

Figure 5:
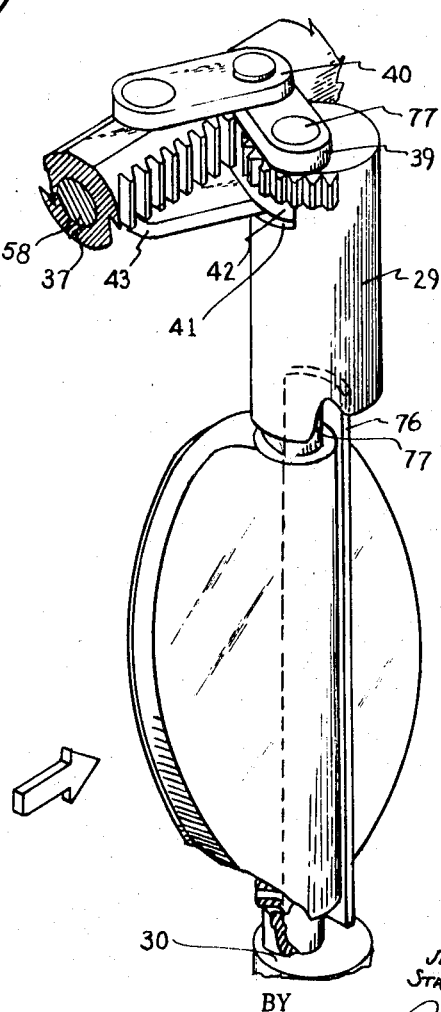
FIG. 5 is a view of the valve closure member and rack connection.

Bushings 29 and 30 are joined by eccentric web 76 which extends through the housing in juxtaposition to shaft 77. Preferably, to minimize flow resistance, web 76 is contoured about shaft 77 as illustrated in FIG. 5. This web maintains the upper and lower bushings in rotational alignment and transmits the actuation force from the upper to the lower bushing during actuation of the valve member.

The shaft 77 is sealed with lip seal 83 formed of a resilient material and biased with a backup spring (not shown) to maintain the seal seated about the shaft. Retainer 80 is turned into a tapped recess in bushing 29 to secure the seal seated about the shaft. A similar lip seal 85 and backup spring construction is used to seal about the periphery of bushing 29 and a retainer 86 is turned into a tapped recess in body 10 surrounding bushing 29 to secure seal 85.

One end of the shaft 77 and the surrounding bushing extend through the valve body 10 for connection to an actuator mechanism. This is shown at the top of FIG. 1 where shaft 77 and bushing 29 extend into housing 31 which is illustrated as an integral portion of the body 10. This housing has a central cavity 33 for the mechanical linkage between the valve components and the actuator with a second cavity defined by cylindrical casing 35 that houses the hydraulic components. The opposite side of housing 31 has a cylindrical boss 34 that is tapped and fitted with a second cylinder 36 which provides for travel of the actuator rack 37 and the hydraulic piston as shown in FIG. 2.

Referring now to FIG. 2, the actuator mechanism will be described. The valve shaft 77 and assembly of bushings 29 and 30 and web 76 are actuated by a rectilinear force that is transmitted by reciprocating rack 37. The upper end of bushing 29 bears a sectored gear 38 which is preferably integral with bushing 29 as shown in FIGS. 2 and 5. This gear meshes with the teeth of rack 37 to provide the mechanical link between the bushing assembly and the rack.

Shaft 77 is connected to rack 37 by crank 39 and link 40 and the upper portion of bushing 29 is grooved at 41 to permit use of an identical crank 42 and link 43 beneath rack 37; see FIG. 5. Shaft 77 also bears arm 46 which extends into cavity 33 to engage the switch blades of microswitches 44 and 45 that register, respectively, the open and closed positions of the valve disc 20. Although these switches are above the cross-sectional plane of FIG. 2, they are illustrated in their approximate position in the cavity 33.

A relief valve is provided in the upper housing 31 as shown with valve member 114 which seats in port 111 under bias from spring 113. Port 112 provides the exit for the valve which is an unit assembly 110 that is turned into a tapped bore in housing 31.

Cylinder 36 is bored and tapped at 117 for connection to a hydraulic line for activation of the actuator. An orifice, as shown, is provided to dampen the response of the rack 37. Piston 115 is secured on the end of rack 37 by suitable means, e.g., by threading the end of rack 37 which is turned into a tapped bore in piston 115. The opposite end of rack 37 extends through web 118 in housing 31 and into cylindrical casing 35. The rack has an intermediate portion of an enlarged diameter shown as 119 and an end portion of smaller diameter shown as 120. The shoulder formed at the juncture of these portions engages flanged sleeve 121 which has circular flange 54 that provides a step for spring 55. The end of rack 37 is bored at 122 with an annular groove 123 at the base of the bore. a tubular insert 124 is turned into a tapped bore in the face of the cylindrical casing, which, at its far end is defined by cylinder 125.

The tube 127 confines the closed position detent of the actuator. The tube 127 is bored and fitted with balls 126 at one end which are held in place between the inner wall of bore 122 and piston rod 128 which extends through tube 127. The free end of piston rod 128, as shown, has an enlarged diameter portion 132. The opposite end supports piston 129 which is mounted in tubular insert 124. Tube 127 also has a stepped diameter bore 131 in which is mounted spring 130 that biases against piston 129 and biases end 128 of the tube 124 against balls 126.

A relief valve bypassing disc 20 is provided and preferably this is integral with the valve body 10 and is formed by cavity 67 and communicating bores 68 and 69 that extend from upstream and downstream, respectively, of the seal ring 74.

FIG. 3 shows an actuator mechanism with the valve structure that has a handwheel 135 which can be used to operate the valve and which is used to unlock the mechanism from detents in the open and closed positions. FIG. 3 shows the upper portion of the valve assembly on body 136, similar to body 10 of FIG. 1 with shaft 137 similar to shaft 77 and upper bushing 138 eccentrically positioned in body 136 in the same manner as previously discussed in FIG. 1. Bushing 138 and shaft 137 are provided with bearings that preferably are needle bearings 142 and 143. The upper end of bushing 138 has a first flange portion 140 and an identical second flange portion 139 which are joined by web 141. Shaft 137 extends through the cavity between these flange potions and into a splined fit with crank 157 which is connnected to the actuator rack with a link in the manner previously discussed. Flange portions 139 and 141 are sectored gears with teeth 144 which engage teeth 145 on the reciprocating rack to provide the timing in the rotation between he bushing assembly and the disc shaft 137.

The detents in the actuator are provided in the handwheel extension from the actuator. Upper flange portion 139 bears shaft 146 on the centerline of the rotation of the bushing assembly and this shaft engages, in a splined fit, the lower end of stem 147. Stem 147 is bored at 148 and fitted with pin 149. Stem 147 is journaled in boss 152 on cap 153 that covers the actuator housing 154. The upper face of boss 152 is provided with two radial grooves into which the ends of pin 149 fit when the valve disc reaches either the open or closed position. The stem 147 is bored at 148 and fitted with pin 149. Stem 147 is journaled in boss 152 on cap 153 that covers the actuator housing 154. The upper face of boss 152 is provided with two radial grooves into which the ends of pin 149 fit when the valve disc reaches either the open or closed position. The stem 147 is biased by spring 151 to force pin 149 into the grooves on the face of boss 152. This spring is supported within cap 154 and surrounds the upper, reduced diameter portion 150 of stem 147, bearing against the shoulder formed at the juncture of the reduced and normal diameter portions of the stem. Cap 154 is turned onto threaded boss 152 with a conventional seal 155. Seals 156 are provided about stem 147 to seal the actuator cavity 33.

Figure 4:
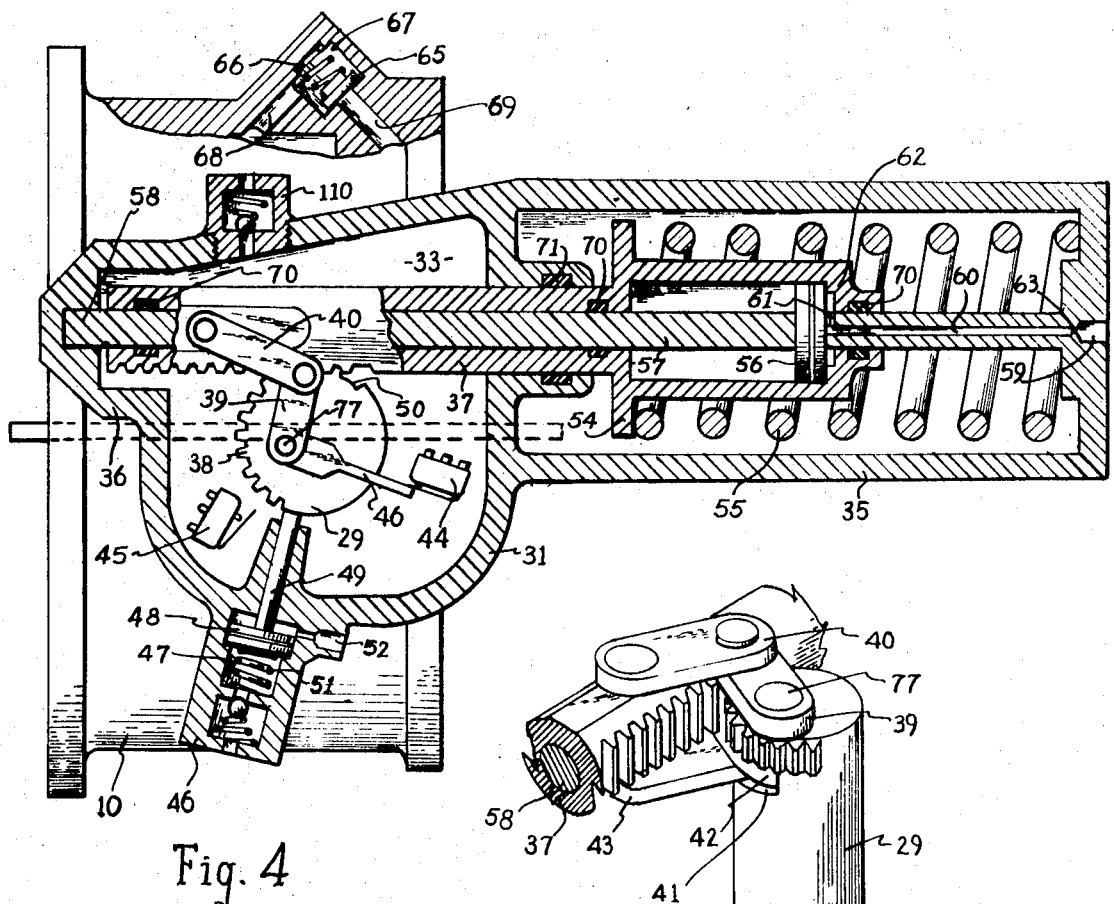

Referring now to FIG. 4, an alternative actuator is shown. The mechanical linkage to the actuator mechanism is mounted within cavity 33 formed by housing 31 similar to that previously discussed, while the actuator is housed within cylindrical casing 35 also similar to that previously discussed. Housing 31 has a circular boss 36 to accommodate the travel of rack 37. The actuator shown is provided with means for locking the valve in the closed position in the manner described in the following paragraph.

Projecting from housing 31 is a cylindrical boss 46 that has a stepped cylindrical cavity 47 which supports lock piston 48 that has a shaft 49 which extends into cavity 33 and bears against bushing 29. Bushing 29 has a recess 50 for seating of the shaft 49 and piston 48 is biased with spring 51 to seat shaft 49 in recess 50 when the valve is in the closed position. A tap 52 is provided for connection to a suitable source of fluid pressure for overcoming spring 51 and retracting shaft 49 to unlock the valve.

Rack 37 is attached to cylinder 53 and preferably, as shown, is an integral extension of cylinder 53. The cylinder has a flange 54 that provides a shoulder for engagement by compression spring 55 which is biased to force cylinder 53 towards housing 31, advancing the rack 37 and opening valve disc 20. A fixed position piston 56 is supported within cylinder 53 on shaft 57 that extends from bore 58 at the end of cylinder 36 to the opposite end of cylindrical casing 35, and the end face of casing 35 is tapped at 59 and a contiguous bore 60 extends through shaft 57, terminating at the face of piston 56. A radial bore 61 is provided in shaft 57 to vent bore 60 into the cylinder cavity which is preferably provided with a peripheral shoulder 62 that serves as a stop for the travel of the cylinder. If desired, an orifice can be provided between tap 59 and bore 60 to dampen the response of cylinder 53 to the application of fluid pressure at tap 59.

The relief means in the valve structure are similar to those previously described with regard to FIG. 2 in that cavity 33 is provided with relief unit 110 and the valve body 10 has a similar integral relief valve bypassing disc 20.

The valve structures described are designed for use in cryogenic service at temperatures from ambient or slightly above to several hundred degrees below zero. At the subzero temperatures, normal lubrication techniques are not applicable and proper functioning of the valve mechanism is assured by the use of the sleeve- or needle-bearing support of the shaft and bushing assembly. In addition the shaft and/or bushings can be covered with a flame-sprayed hard facing material about their bearing surfaces to impart wear resistance. The actuator mechanism is preferably provided with glass-filled Teflon bushings shown at 70 about the rack 37 in FIG. 4.

The operation of the valve mechanism is basically the same for each of the embodiments shown; however, the locking and the unlocking of the actuator differs with these embodiments. The initial movement of rack 37 is transmitted through the sector gear to rotate the bushing assembly and translate shaft 77 resulting in a poppetlike retraction of disc 20 from seal ring 74. As the shaft 77 is translated in the eccentric bushing assembly, the link and crank connection begin to rotate shaft 77 to open disc 20 in a butterflylike action until disc 20 is positioned parallel to the flow stream through the valve body. The rack is operative during a limited portion of the travel of the reciprocating actuator during the initial opening or the final closing of the disc 20. During this limited portion of travel, shaft 77 is translated an axial distance away from or towards the seat in a nearly straight path. This blade translation is substantially the entire motion while the blade is in a position from normal to about 5° deflected from normal to the flow path through the valve. At greater angular deflections, the rotational motion increases to become the predominant movement of the blade 20.

The maximum torque on the blade shaft 77 occurs when the valve disc 20 is abut 75° open and this torque places link 40 in tension. In this position, the link 40 is substantially parallel to rack 37 so that the loading normal to the rack is at a minimum valve, thereby minimizing wear on the rack bearings 70 and 71.

In the embodiment shown in FIG. 2, when the valve is open, its normal position, spring 55 is extended. Rack motion during closing compresses spring 55 as it moves flange seat 54. When annular groove 123 in rack 37 comes over balls 126, spring 130 will force piston 129 away from the rack end of its cylinder, causing the enlarged end 128 of piston rod 127 to drive balls 126 into the annular groove and thus locking the rack 37 against further movement. To unlock the actuator, fluid pressure is supplied through port 134 to compress spring 130 and advance piston 129 towards the rack, releasing balls 126 from groove 123. When this occurs spring 55 is free to displace the rack in the opening mode of the valve.

The manually actuated valve mechanism of FIG. 3 is unlocked from either the open or closed position by lifting handle 135 to disengage the ends of pin 149 from the grooves in boss 152 and then rotating the handwheel to open or close the valve.

The valve shown in FIG. 4 is closed from it normally open position by fluid pressure through orifice 63 which drives cylinder 62 from casing 31, reciprocating rack 37 to close valve disc 20. Spring 55 is compressed in this action by the advance of flange seat 54. The valve is locked in the closed position by shaft 49 which engages recess 50 on bushing 29. The actuator is unlocked by the application of fluid pressure through port 52 to force piston 48 against spring 51 and retract rod 49 from engagement in recess 50. When this occurs, spring 55 is free to advance rack 37 in the opening mode.

While the invention has been described by reference to specifically illustrated modes of practice, it is not intended that the invention be unduly limited by the specifically illustrated embodiments, but instead it is intended that the invention be defined by the elements and their obvious equivalents set forth in the following claims.

We claim:

1. A valve structure comprising:

a housing having fluid inlet and fluid outlet ports;

a valve closure member having a centrally positioned sleeve;

closure member seat means for engagement by said valve closure member;

a solid shaft extending through said housing and said sleeve with positive interlocking means to said sleeve to thereby provide rigid attachment to and support of said valve closure member;

shaft-bearing means at opposite sides of said housing to rotatably support said shaft on a first center of rotation;

bushing means supporting each of said shaft-bearing means;

bushing bearing means to support each of said bushings on a second center of rotation eccentric to said first center of rotation with one of said bushing means extending externally of said housing;

first actuation means to apply a rotational force to the end of said shaft extending through one side of said housing; and second actuation means to apply a rotational force to said one of said bushing means extending through the said side of said housing, said means including interconnecting means to transmit such applied rotational force to the other of said bushing comprising a web extending between said bushings through said housing, eccentric to an in juxtaposition to said shaft.

2. The valve structure of claim 1 in combination with a single reciprocating actuation means wherein said second actuation means comprises gear means on said one of said bushings and in driven relationship to rack means on said reciprocating actuation means and wherein said first actuation means comprises crank means connected to said shaft and link means between said reciprocating means and said crank means.

3. The valve of claim 2 wherein said rack means in engagement with said gear means on said bushing means for a limited portion of the travel of said reciprocating means during movement of the closure member into and out of engagement with the closure member seat means.

4. The valve of claim 3 wherein said rack means is operative during the limited portion of its engagement with the gear means to translate the center of the shaft an axial distance substantially equal to the travel of said reciprocating means during the limited portion of engagement whereby the valve closure member is removed from seat means in substantially axial movement without rotation of the closure member.

5. The valve of claim 2 wherein the link means is positioned substantially parallel to the reciprocating means when the valve closure member is about 75° open whereby to minimize the loading on bearing supports for said reciprocating means.

6. The valve of claim 1 wherein said shaft-bearing means and said bushing bearing means comprise bearings with extended axial bearing surfaces.

7. The valve of claim 1 including detents carried by one of the said shaft and bushing means operative to lock said valve closure member in at least one of the open and closed positions.

8. The valve of claim 2 including detents carried by said reciprocating means and operative to lock said valve closure member in at least one of the open and closed positions.

9. The valve of claim 2 including spring means bearing on said reciprocating means and operative to bias said valve closure member into at least one of the open and closed positions.